US011727779B1

(12) United States Patent
Butler

(10) Patent No.: US 11,727,779 B1
(45) Date of Patent: Aug. 15, 2023

(54) CHARGE AND GUARDIAN SAFETY SYSTEM

(71) Applicant: Beatrice Butler, Clearwater, FL (US)

(72) Inventor: Beatrice Butler, Clearwater, FL (US)

( * ) Notice: Subject to any disclaimer, the term of this patent is extended or adjusted under 35 U.S.C. 154(b) by 0 days.

(21) Appl. No.: 17/488,857

(22) Filed: Sep. 29, 2021

Related U.S. Application Data

(60) Provisional application No. 63/084,603, filed on Sep. 29, 2020.

(51) Int. Cl.
*H04B 1/3827* (2015.01)
*G08B 21/02* (2006.01)

(52) U.S. Cl.
CPC ..... *G08B 21/0266* (2013.01); *G08B 21/0208* (2013.01); *G08B 21/0236* (2013.01); *G08B 21/0269* (2013.01); *G08B 21/0275* (2013.01); *G08B 21/0286* (2013.01); *G08B 21/0288* (2013.01); *G08B 21/0294* (2013.01)

(58) Field of Classification Search
CPC ............ G08B 21/0266; G08B 21/0208; G08B 21/0236; G08B 21/0269; G08B 21/0275; G08B 21/0286; G08B 21/0288; G08B 21/0294
See application file for complete search history.

(56) References Cited

U.S. PATENT DOCUMENTS 6,278,370 B1 8/2001 Underwood
6,396,403 B1 5/2002 Haner
6,472,989 B2 10/2002 Roy, Jr.
6,573,835 B2 6/2003 Irizarry et al.
6,888,464 B1 5/2005 Maloney
7,511,627 B2 3/2009 Holoyda
8,390,463 B2 3/2013 Munthe-Kaas et al.
9,064,391 B2 6/2015 Vardi et al.
9,129,503 B2 9/2015 Borlenghi
9,503,563 B2 11/2016 Jang et al.
9,645,646 B2 5/2017 Cowley et al.
9,747,770 B1 8/2017 Barlett
9,754,078 B2 9/2017 Ramsay et al.
9,854,385 B2 12/2017 Oliver et al.
9,911,301 B1 3/2018 Foley
9,922,537 B2 3/2018 Shah et al.
(Continued)

FOREIGN PATENT DOCUMENTS

GB 2447459 9/2008
GB 2505981 3/2014
KR 20180043051 * 10/2016 ............ A01K 15/04

*Primary Examiner* — An T Nguyen
(74) *Attorney, Agent, or Firm* — John Rizv; John Rizvi, P.A.—The Patent Professor®

(57) ABSTRACT

A charge and guardian safety system may include a system console having a console housing. At least one article fastening device may be carried by the console housing. The at least one article fastening device may be configured to attach to the corresponding guardian or charge. The system console of at least one of the first wearable article and the second wearable article may be configured to emit at least one alarm if the second wearable article travels farther than a predetermined separation distance from the first wearable article. The at least one article fastening device of at least one of the first wearable article and the second wearable article may be configured to tighten or contract with the at least one alarm.

12 Claims, 7 Drawing Sheets

(56) References Cited

U.S. PATENT DOCUMENTS

| | | | | |
|---|---|---|---|---|
| 9,940,808 | B2 | 4/2018 | Shapiro et al. | |
| 10,073,666 | B2 | 9/2018 | Levesque et al. | |
| 10,249,165 | B1 | 4/2019 | Doetzel | |
| 10,249,166 | B1 | 4/2019 | Carter | |
| 10,373,450 | B2 | 8/2019 | Mandlakazi | |
| 10,395,500 | B1 | 8/2019 | Miller | |
| 10,459,485 | B2 | 10/2019 | Inagaki et al. | |
| 10,460,583 | B1 | 10/2019 | Brantner | |
| 2001/0052849 | A1 | 12/2001 | Jones, Jr. | |
| 2004/0046658 | A1* | 3/2004 | Turner | G08B 21/0227 340/539.11 |
| 2007/0018812 | A1 | 1/2007 | Allen et al. | |
| 2008/0169932 | A1 | 7/2008 | Desrosiers et al. | |
| 2012/0007735 | A1 | 1/2012 | Rhyins | |
| 2015/0084769 | A1 | 3/2015 | Messier et al. | |
| 2015/0109126 | A1* | 4/2015 | Crawford | G08B 21/0269 340/539.13 |
| 2017/0117928 | A1* | 4/2017 | Chien | G04G 17/04 |
| 2018/0014778 | A1 | 1/2018 | Cronin et al. | |
| 2019/0088100 | A1 | 3/2019 | Shapiro et al. | |

* cited by examiner

CHARGE AND GUARDIAN SAFETY SYSTEM

CROSS-REFERENCE TO RELATED APPLICATION

This application claims the benefit of U.S. Provisional Application 63/084,603, filed Sep. 29, 2020, which is hereby incorporated by reference herein in its entirety.

FIELD OF THE INVENTION

The present invention relates generally to safety systems for guardians, and more particularly, to a charge and guardian safety system suitable for alerting a guardian when a child or other charge is separated from the guardian and enabling the guardian to track or monitor the location of the charge.

BACKGROUND OF THE INVENTION

Small children and adults with diminished mental capacity may require constant supervision. Toddlers are particularly vulnerable to danger. Toddlers who can crawl or walk have a tendency to wander, as they are eager to explore their environment. However, toddlers are typically not able to identify and avoid dangers such as swimming pools and streets which could potentially harm or kill them.

Young children may not have developed the ability to use a mobile device to communicate with a caregiver. Adults with diminished mental capacity may never have had or may have lost such capability. Monitoring the whereabouts of such persons may be required to ensure their safety and prevent them from becoming lost. This may be particularly the case in crowded areas such as shopping malls, airports, beaches, and the like. If a child becomes separated from his or her guardian, he or she may not have the ability to locate the guardian and may become anxious. Small children who are separated from their guardians may also face the danger of kidnapping in some instances. Autistic persons and those afflicted with Alzheimer's disease may wander from a care facility and risk becoming lost.

In recent years, due to the prevalence of child abductions in the United States, "Amber Alerts" have been used to disseminate information via various types of media such as radio stations, Internet radio, satellite radio, television stations, text messages and cable TV. A variation of the "Amber Alert" is the Google Child Alert, in which an Amber alert is presented to Google users if those users search for related information in a location in which a child has recently been abducted. In some large metropolitan areas, Amber alerts may be displayed on scroll boards adjacent to busy highways and freeways.

Every year, infants or other young children are injured or killed as a result of being accidently left in parked vehicles after a guardian leaves the vehicle. Extreme temperatures may result inside the vehicle after the cooling or heating system of the vehicle is turned off. In such cases, the guardian may simply forget and may not remember that the child is in the vehicle until he or she subsequently returns to the vehicle after an extended period of time has elapsed.

Wristbands have been used for years to fasten a wristwatch on the wrist of a wearer as well as to provide a wearer entry to an event or building, identify medical patients, and the like. Some types off wristbands may include the capacity to electronically store information. Some types of wristbands may include radio frequency identification (RFLD) devices which have the capability to remotely access and display or otherwise use information.

A wristband may be secured to the wrist using a buckle or the like. Other types of bands, such as electronic monitoring anklets, may be secured on the ankle of a person to track the location of the person. For example, electronic monitoring anklets may be used to monitor the location of an inmate or person subjected to house arrest.

Accordingly, there is need for a charge and guardian safety system suitable for alerting a guardian when a child or other charge is separated from the guardian and enabling the guardian to track or monitor the location of the charge.

SUMMARY OF THE INVENTION

The present invention is directed to a charge and guardian safety system suitable for alerting a guardian when a child or other charge is separated from the guardian and enabling the guardian to track or monitor the location of the charge. The charge and guardian safety system may include a first wearable article which is configured to be worn by a caregiver or guardian and a second wearable article which is worn by a child, adult with diminished mental capacity or other charge. Each wearable article may include a system console. The system console may include a console housing. The console housing may be sized and configured to contain the functional components of each wearable article.

The first wearable article which is worn by the guardian may be configured to track the location of the second wearable article which is worn by the charge. The first and second wearable articles may be paired together electronically. At least one of the first wearable article and the second wearable article may be configured to emit at least one alarm if the second wearable article travels farther than a predetermined separation distance from the first wearable article. In some embodiments, the first wearable article and/or the second wearable article may be configured to tighten or contract with the at least one alarm. The first and second wearable articles may be configured for release or removal from the guardian and the charge only if the first and second wearable articles are in close proximity to each other.

In an illustrative implementation of the invention, a charge and guardian safety system suitable for alerting a guardian when a child or other charge is separated from the guardian and enabling the guardian to track or monitor the location of the charge may include a system console. The system console may include a system console having a console housing. The console housing may be sized and configured to contain the functional components of each wearable article. An article fastening device may extend from the console housing. The article fastening device may be configured to attach to the corresponding guardian or charge. The system console of at least one of the first wearable article and the second wearable article may be configured to emit at least one alarm if the second wearable article travels farther than a predetermined separation distance from the first wearable article. In some embodiments, the article fastening device of the first wearable article and/or the second wearable article may be configured to tighten or contract with the at least one alarm. The article fastening device of the first and second wearable articles may be configured for release or removal from the guardian and the charge only if the first and second wearable articles are in close proximity to each other.

In a second aspect, the article fastening device may include a first strap segment and a second strap segment configured to detachably engage the first strap segment.

In another aspect, at least one strap fastener may detachably fasten the second strap segment to the first strap segment.

In another aspect, the at least one strap fastener may include a plurality of strap openings in the first strap segment and at least one strap fastening stud on the second strap segment and configured for detachably engaging a selected one of the plurality of strap openings.

In another aspect, a first housing extension and a second housing extension may extend from the console housing of the system console, and the first strap segment and the second strap segment may extend from the first housing extension and the second housing extension, respectively.

In another aspect, a controller may functionally interface with a strap lock, and the strap lock may operably interface with the at least one strap fastener to maintain the at least one strap fastener in a secure configuration until the first wearable article and the second wearable article are brought into close proximity to each other.

In another aspect, at least one air pump may operably interface with the controller, and the air pump may be configured to tighten the first strap segment and the second strap segment on the guardian and/or the charge responsive to or simultaneous with actuation of the at least one alarm.

In another aspect, the at least one visible alarm may include at least one LED.

In another aspect, the at least one alarm may include at least one audible alarm.

In another aspect, the at least one audible alarm may include at least one speaker.

In another aspect, the at least one alarm may comprise a haptic feedback (e.g., a vibration).

In another aspect, the speaker of the at least one audible alarm may be configured to broadcast or emit a loud voice which says, "ALERT ALERT ALERT" upon activation of the audible alarm.

In another aspect, at least one camera may interface with the controller and may be configured to transmit an image of the charge from the second wearable article worn by the charge to the first wearable article worn by the guardian.

In another aspect, at least one display may be provided on the console housing of the system console and operably interface with the controller, and the controller may be configured to present the image of the charge on the at least one display.

In another aspect, a GPS may functionally interface with the controller and the controller may be configured to present a GPS signal which indicates the location of the other of the first wearable article or the second wearable article.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
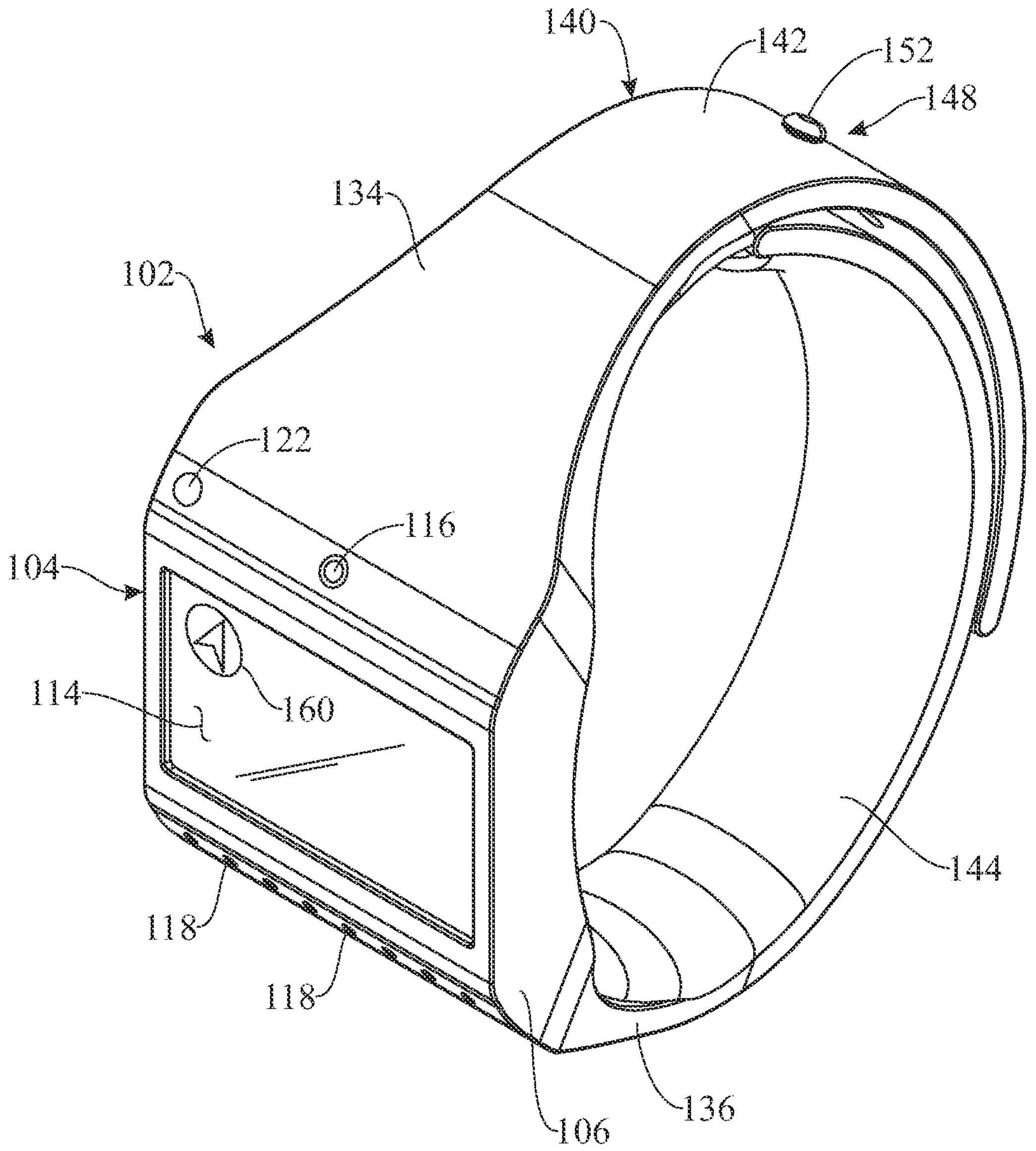
FIG. 1 presents a top perspective view of a typical wearable article in accordance with an illustrative embodiment of the charge and guardian safety system of the present invention.
Figure 2:
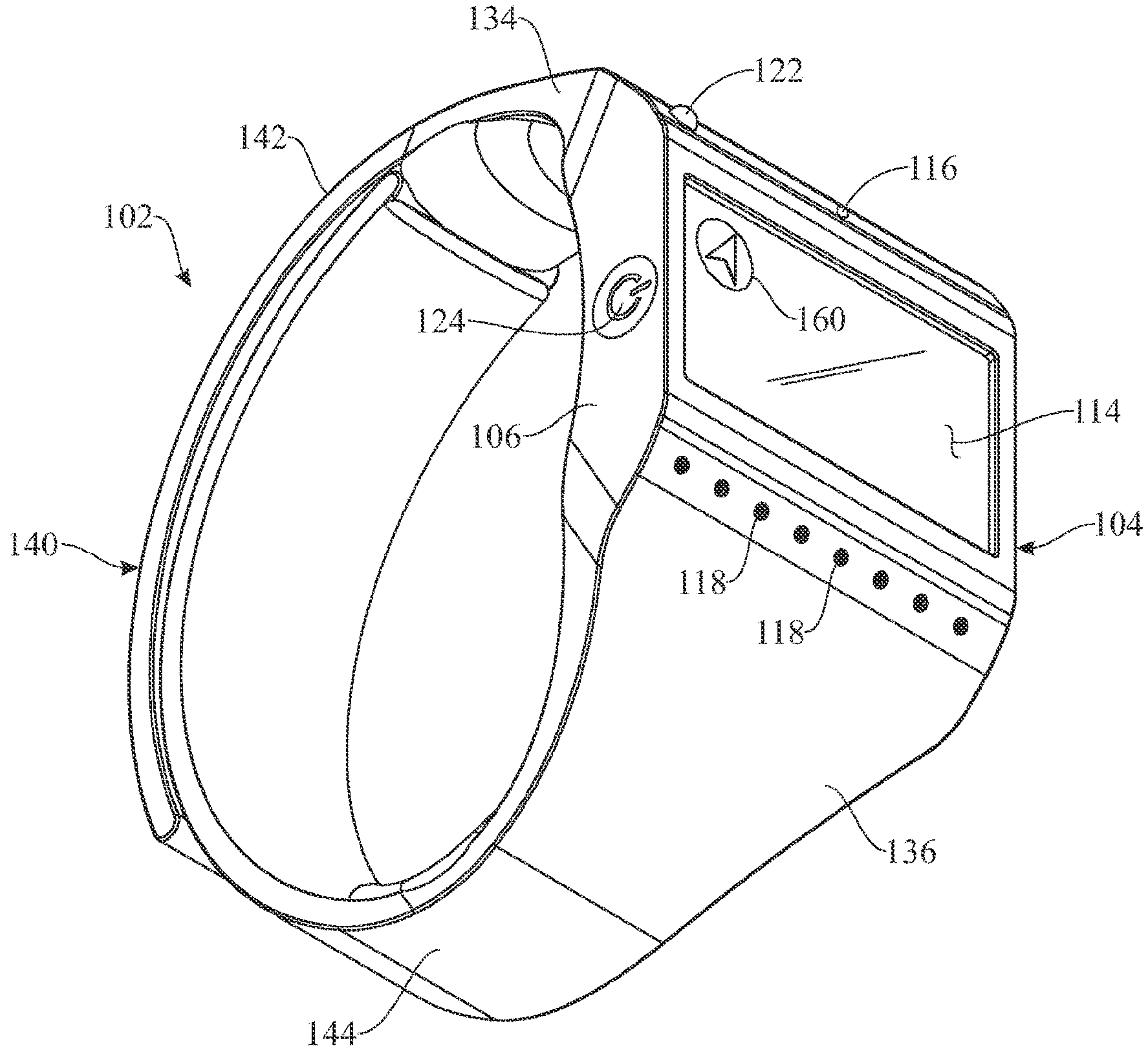
FIG. 2 presents a bottom perspective view of a typical wearable article in accordance with an illustrative embodiment of the charge and guardian safety system of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a charge and guardian safety system suitable for alerting a guardian when a child or other charge is separated from the guardian and enabling the guardian to track or monitor the location of the charge.

Referring initially to FIGS. 1-7, a charge and guardian safety system, hereinafter system 100, is illustrated in accordance with an exemplary embodiment of the present invention. As shown for instance in FIG. 4, the system 100 may include a first wearable article 102 and a second wearable article 108. The first wearable article 102 may be worn by the guardian 168 and may be configured to track the location of a second wearable article 108 may be wom by the charge 174. The guardian 168 may be a parent, babysitter or other caregiver who has the responsibility to monitor the location and/or activities of the charge 174. The charge 174 may be a toddler, small child, adult with diminished mental capacity, animal or any other person or animal which requires protective monitoring.

The first wearable article 102 and the second wearable article 108 may be configured to be paired together electronically, such as upon positioning of the second wearable article 108 within a predetermined activation distance of the first wearable article 102. Pairing of the first wearable article 102 and the second wearable article 108 may enable the first wearable article 102 to "recognize" the second wearable article 108 during use of the system 100. The system 100 may be activatable to alert the guardian 168 when the charge 174 is separated by a predetermined separation distance 184 (FIG. 4) from the guardian 168. The system 100 may enable the guardian 168 to track or monitor the location of the charge 174. The first wearable article 102 which is worn by the guardian 168 may be configured to track the location of the second wearable article 108 which is worn by the charge 174.

At least one of the first wearable article 102 and the second wearable article 108 may be configured to emit at least one alarm upon activation of the system 100 if the second wearable article 108 travels beyond the separation distance 184 of the first wearable article 102. In some embodiments, the first wearable article 102 and/or the second wearable article 108 may be configured to tighten or contract with the at least one alarm. As noted previously, the at least one alarm may comprise a haptic feedback (e.g., a vibration). The first wearable article 102 and the second wearable article 108 may be configured for release or removal from the guardian 168 and the charge 174, respectively, only if the first wearable article 102 and the second wearable article 108 are in close proximity to each other, such as within the activation distance.

The following description will apply to the first wearable article 102 of the system 100. In some embodiments, however, the first wearable article 102 and the second wearable article 108 may have the same or similar designs. Therefore, the first wearable article 102 and the second wearable article 108 may be functionally interchangeable, and the same description which applies to the first wearable article 108 may equally apply to the second wearable article 108. In some embodiments, the first wearable article 102 may include only those features which are necessary to notify and enable the guardian 168 to monitor the location and/or activities of the charge 174 via the second wearable article 108. Accordingly, the second wearable article 108 may include only those features which are necessary to monitor the location and/or activities of the charge 174 and transmit data which indicates those locations and/or activities to the first wearable article 102.

The first wearable article 102 may include a system console 104. The system console 104 may include a console housing 106. The console housing 106 may be suitably sized and configured to contain the functional components of the first wearable article 102, which functional components will be hereinafter described.

Figure 3:
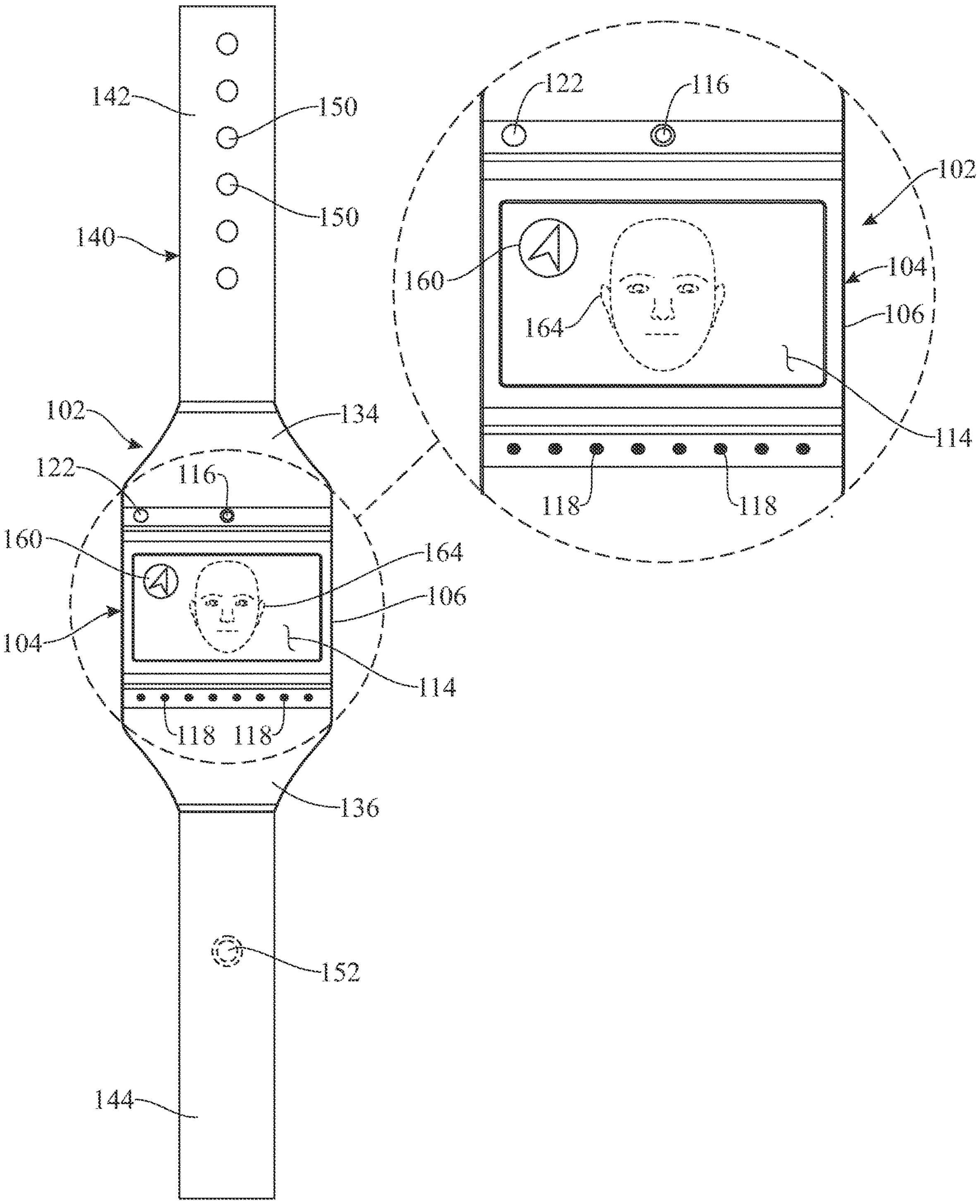
FIG. 3 presents a front view of the first wearable article and an enlarged view of the system console of the first wearable article, more particularly illustrating a GPS signal and an image of a charge wearing the second wearable article on the display of the first wearable article.
Figure 4:
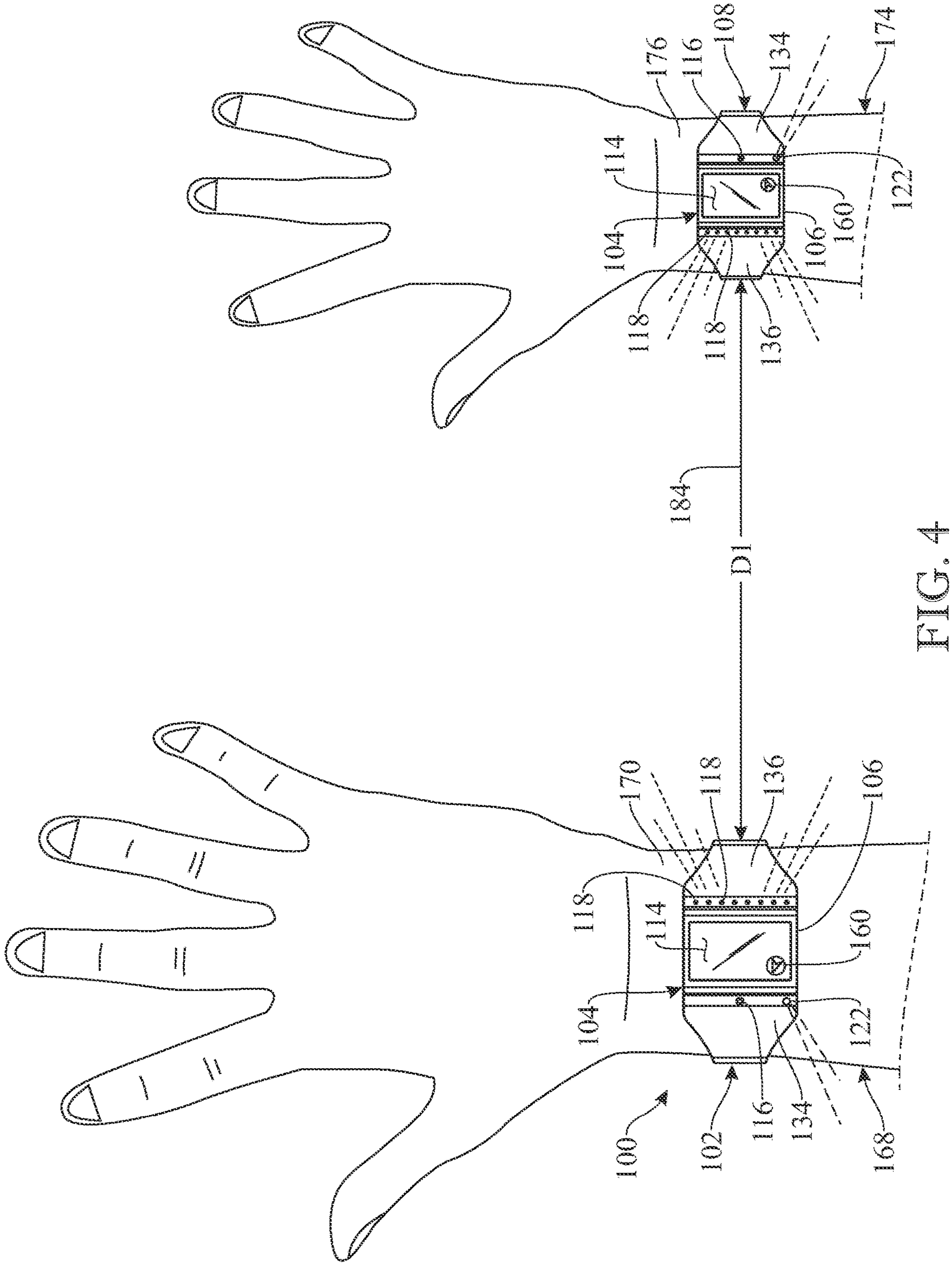
FIG. 4 presents front views of a first wearable article and a second wearable article of the safety system, with the first wearable article fastened to the wrist of a guardian and the second wearable article fastened to the wrist on a charge to be monitored by the guardian.
Figure 7:
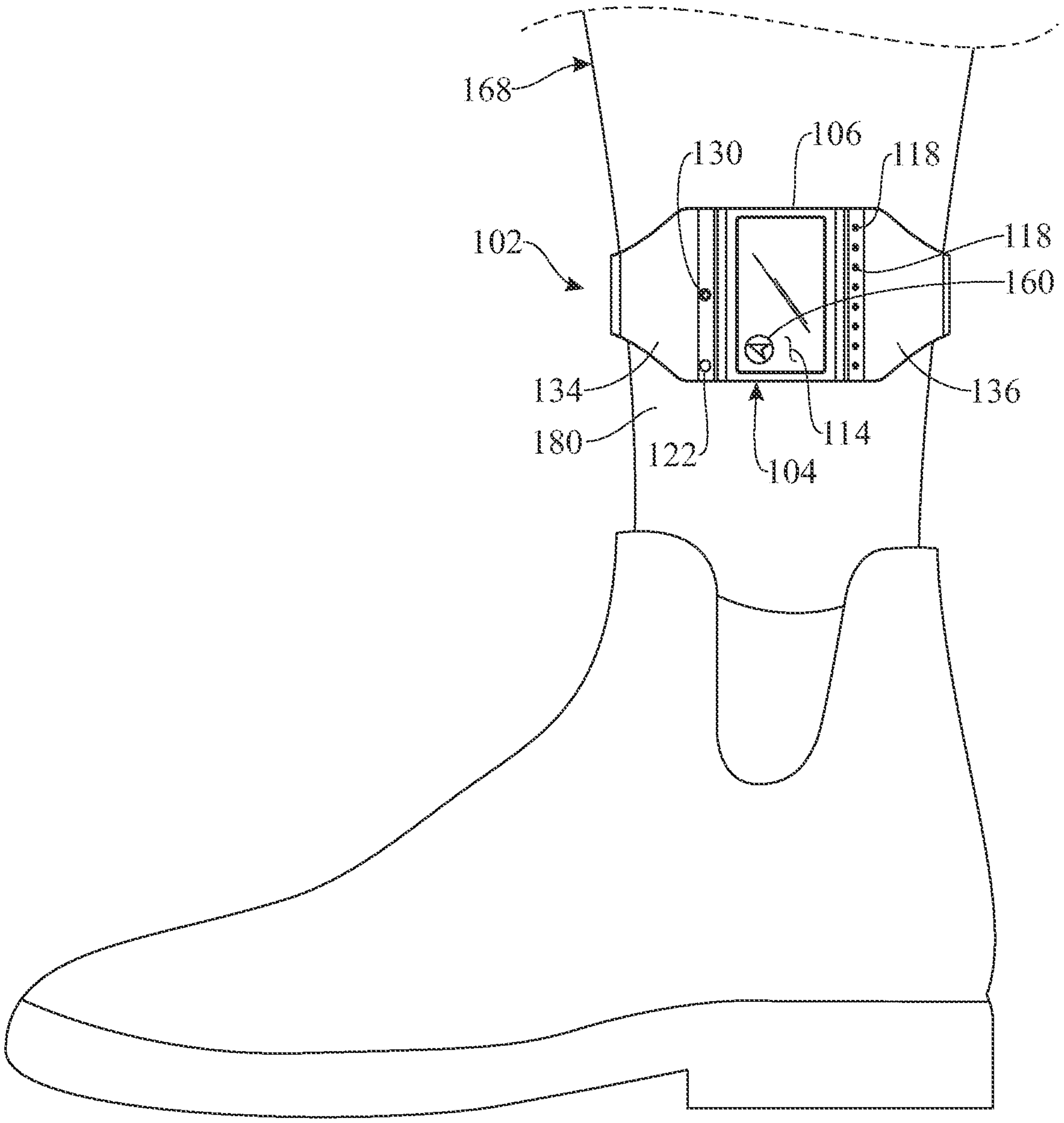
FIG. 7 is a front view of the first wearable article fastened on the ankle of a guardian or charge in alternative application of the safety system of the present invention.

At least one article fastening device 140 may extend from the console housing 106 of the system console 104. The article fastening device 140 may be configured for attachment to the guardian 168. In some embodiments, the article fastening device 140 may include a first strap segment 142 and a second strap segment 144. The second strap segment 144 may be configured to detachably engage the first strap segment 142 according to the knowledge of those skilled in the art. Accordingly, as illustrated in FIG. 3, in some embodiments, a plurality of spaced-apart strap openings 150 may be provided in the first strap segment 142. At least one strap fastening stud 152 may be provided on the second strap segment 144. The strap fastening stud 152 may be configured for detachable insertion into a selected one of the strap openings 150 to detachably secure the first strap segment 142 and the second strap segment 144 around the wrist 170 of the guardian 168, as illustrated in FIG. 4. Alternatively, as illustrated in FIG. 7, in some applications, the first strap segment 142 and the second strap segment 144 may be secured on the ankle 180 of the guardian 168. In some embodiments, the article fastening device 140 may be suitably sized and configured to be fastened around the neck (not illustrated) of the guardian 168.

In some embodiments, a first housing extension 134 and a second housing extension 136 may extend from the console housing 106 of the system console 104. The first strap segment 142 and the second strap segment 144 of the article fastening device 140 may extend from the first housing extension 134 and the second housing extension 136, respectively.

In some embodiments, the strap fastener 148 on each of the first wearable article 102 and the second wearable article 108 may be configured to secure each corresponding article fastening device 140 only if the first wearable article 102 and the second wearable article 108 are within the predetermined activation distance to each other, typically as will be hereinafter described. The strap fastener 148 may be configured to release each article fastening device 140 for removal from the guardian 168 or the charge 174 only if the first wearable article 102 and the second wearable article 108 are within the predetermined activation distance to each other.

Figure 5:
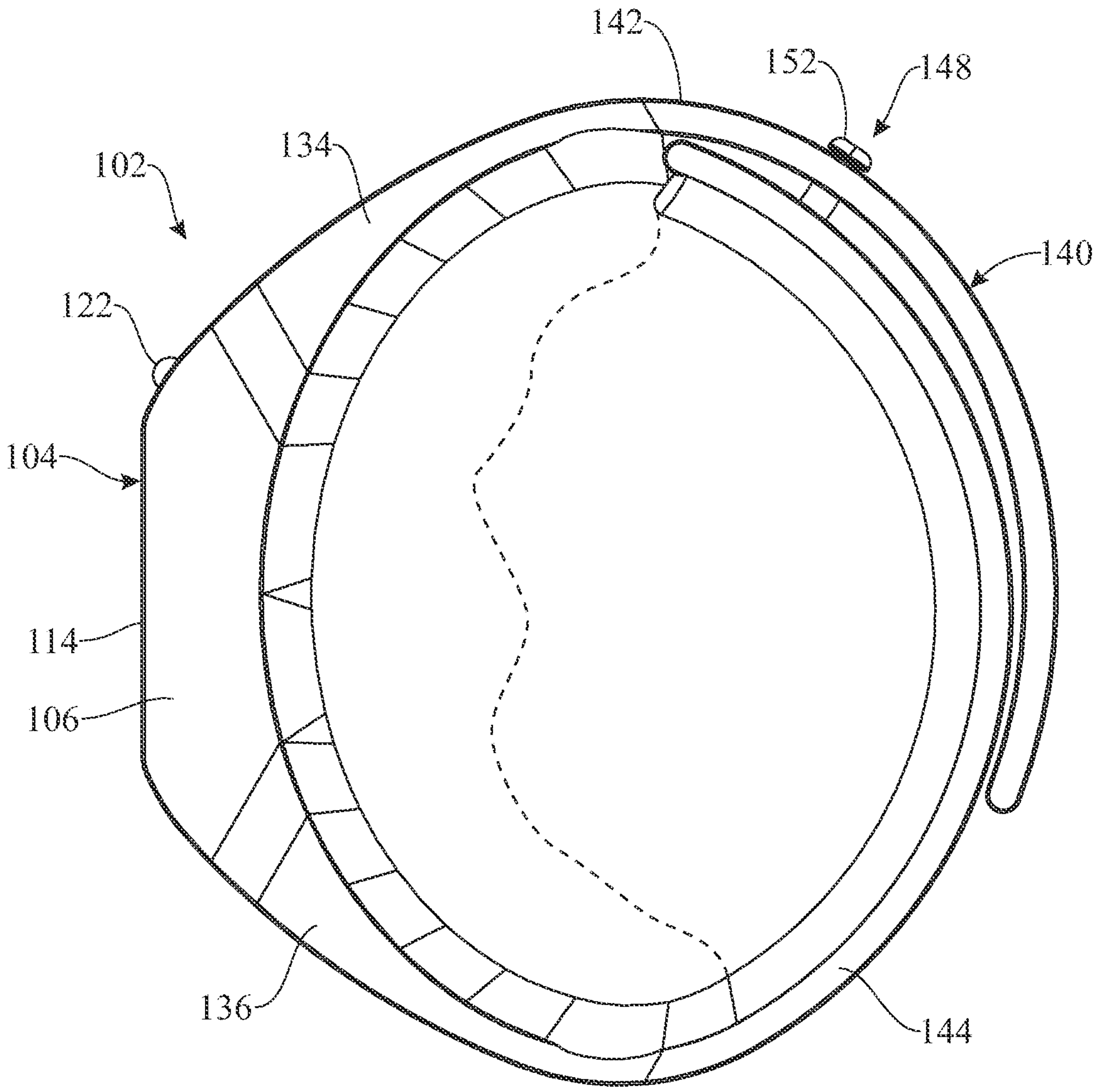
FIG. 5 presents a side view of the first wearable article, more particularly illustrating typical contracting of the article fastening device of the first wearable article upon activation thereof.

In some embodiments, the system console 104 of at least one of the first wearable article 102 and the second wearable article 108 may be configured to emit at least one alarm if the second wearable article 108 travels beyond the predetermined separation distance 184 from the first wearable article 102. The at least one alarm may include at least one of an audible alarm, a haptic feedback-based alarm (e.g., a vibration) and a visible alarm. In some embodiments, the audible alarm may include a beeping sound and/or a loud voice which says, "ALERT ALERT ALERT" upon activation of the audible alarm. The at least one visible alarm may include at least one LED light 118. In some embodiments, the visible alarm may include a plurality of LED lights 118 which may be provided in spaced-apart relationship with respect to each other on the console housing 106 of the system console 104. In some embodiments, the article fastening device 140 of the first wearable article 102 and/or the second wearable article 108 may be configured to tighten or contract with the at least one alarm according to the knowledge of those skilled in the art. For example and without limitation, as illustrated in FIG. 5, in some embodiments, the article fastening device 140 may be configured to form a strap constriction 156 in which the first strap segment 142 and the second strap segment 144 apply pressure against the guardian's wrist 170 or the child's wrist 176 (FIG. 4) to notify the guardian 168 and/or the charge 174 that the charge 174 has strayed beyond the predetermined separation distance 184 from the guardian 168.

In some embodiments, the second wearable article 108 may be configured to capture still and/or video images 164 of the charge 174. The second wearable article 108 may be configured to transmit the captured image or images 164 (FIG. 3) to the first wearable device 102. The first wearable device 102 may be configured to present the captured image or images 164 for viewing by the guardian 168.

Figure 6:
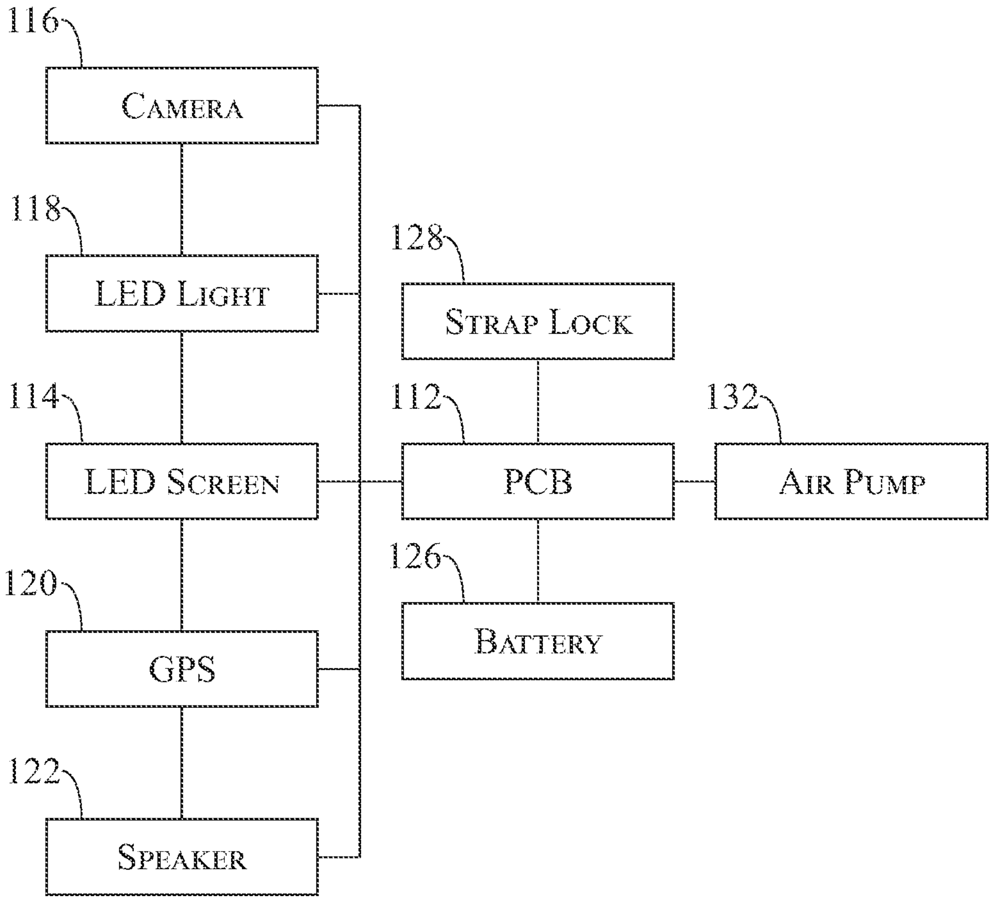
FIG. 6 presents a block diagram of a typical control system for each of the first wearable article and the second wearable article of the safety system of the present invention.

As illustrated in FIG. 6, the first wearable article 102 and the second wearable article 108 may each include at least one controller 112. In some embodiments, the controller 112 may include at least one Printed Circuit Board (PCB). The controller 112 may be configured to execute the various functions of the system 100.

At least one power source 126 may electrically interface with the controller 112. The power source 126 may include at least one rechargeable battery and/or at least one disposable battery, for example and without limitation. In some embodiments, at power source 126 may include at least one solar cell.

At least one display 114 may operably interface with the controller 112. The display 114 may be provided on the console housing 106 of the system console 104. In some embodiments, the display 114 may include at least one LED screen, for example and without limitation.

A GPS (Global Positioning System) 120 may interface with the controller 112. The GPS 120 may be configured to continually monitor the location of the corresponding first wearable article 102 or second wearable article 108. The GPS 120 may be configured to present a GPS signal 160 which corresponds to the location of each corresponding one or the other of the first wearable article 102 or the second wearable article 108. The controller 112 may have the capability to transmit the location of the first wearable article 102 or second wearable article 108 to the opposite one of the first wearable article 102 or second wearable article 108. The controller 112 may additionally be configured to indicate the location of the opposite one of the first wearable article 102 or second wearable article 108 on the display 114. Via inputs from the GPS 120, the controller 112 of each of the first wearable article 102 and the second wearable article 108 may have the capability to measure the distance between them and display the measured distance on the display 114 of each. The controller 112 may additionally have the capability to compare the measured distance to the predetermined separation distance 184 and activate the system 100 if the measured distance exceeds the separation distance 184.

At least one strap lock 128 may interface with the controller 112. The strap lock 128, via actuation of the controller 112, may be configured to lock the strap fastener 148 in the locked configuration responsive to electronic pairing of the first wearable article 102 and the second wearable article 104, according to the knowledge of those skilled in the art.

At least one air pump 138 may operably interface with the controller 112. The air pump 138 may interface with the article fastening device 140 to facilitate contraction and tightening of the article fastening device 140 on the guardian wrist 170 (FIG. 4) of the guardian 168 or the charge wrist 176 of the charge 174, responsive to input from the controller 112, in the event that the controller 112 senses that the measured distance between the first wearable article 102 and the second wearable article 108 exceeds the predetermined separation distance 184, typically via input from the GPS 120. In some embodiments, at least one air bladder (not illustrated) may be provided on or in each of the first strap segment 142 and the second strap segment 144 of the article fastening device 140. The air pump 138 may be disposed in pneumatic communication with each air bladder. Accordingly, the air pump 138 may be configured to inflate each air bladder with air to facilitate the strap constriction 156 (FIG. 5) of the first strap segment 142 and the second strap segment 144 to notify the guardian 168 and/or the charge 174 that the charge 174 has strayed beyond the separation distance 184.

At least one speaker 122 may interface with the controller 112. The controller 112 may be configured to emit or broadcast the audible alarm through the speaker 122 upon activation of the system 100. The speaker 122 may be provided in any suitable location on the console housing 106 of the system console 104.

The at least one visible alarm 118 may interface with the controller 112. The controller 112 may be configured to activate the visible alarm 118 upon actuation of the system 100.

In some embodiments, at least one camera 116 may interface with the controller 112. The camera 116 may include at least one still-image camera and/or at least one video camera. The controller 112 may be configured to transmit at least one image 164 (FIG. 3) of the charge 174 from the second wearable article 108 worn by the charge 174 to the first wearable article 102 worn by the guardian 168. As illustrated in FIG. 3, the controller 112 may be configured to present the image 164 on the display 114. Accordingly, the image 164 may aid the guardian 168 in locating the charge 174 if the charge 174 strays beyond the separation distance 184 between the first wearable article 102 and the second wearable article 108. The camera 116 may be provided in any suitable location on the console housing 106 of the system console 104.

In typical application, the system 100 may monitor the location of a charge 174 with respect to a guardian 168 and become activated if the charge 174 strays beyond the predetermined separation distance 184 from the guardian 168. In some applications, the separation distance 184 may be at least about 6 feet, for example and without limitation. Accordingly, as illustrated in FIG. 4, the first wearable article 102 may be fastened on the wrist 170 of the guardian 168, and the second wearable article 108 may be fastened on the wrist 176 of the charge 174. Alternatively, as illustrated in FIG. 7, the first wearable article 102 may be fastened on the ankle 180 of the guardian 168 and/or the second wearable article 108 may be fastened on the ankle (not illustrated) of the charge 174. Still further in the alternative, the first wearable article 102 and/or the second wearable article 108 may be fastened on the neck (not illustrated) of the guardian 168 and/or the charge 174, respectively.

In some applications, the first wearable article 102 and the second wearable article 108 may be paired electronically by placing the second wearable article 108 within the predetermined activation distance of the first wearable article 102. In some applications, the separation distance may be less than about 6 feet, for example and without limitation. Accordingly, the strap lock 128 (FIG. 6) may lock the article fastening device 140 such that the first wearable article 102 may not be released and removed from the guardian 168 and the second wearable article 108 may not be released and removed from the charge 174 unless the first wearable article 102 and the second wearable article 108 are within the activation distance of each other.

In the event that the charge 174 strays beyond the separation distance 184, the system 100 may become activated. Accordingly, the controller 112 of the first wearable article 102 and/or the second wearable article 108 may actuate the visual alarm 118 and/or the audible alarm typically through the speaker 122. The guardian 168 and/or the charge 174 may thus be notified that the charge 174 has strayed beyond the separation distance 184, and this may prompt the guardian 168 to look for the charge 174, and/or vice-versa.

In some applications, the controller 112 of the first wearable article 102 and/or the second wearable article 108 may actuate the air pump 132 to inflate the air bladder or bladders (not illustrated) on or inside the article fastening device 140. This may additionally notify the guardian 168 and/or the charge 174 that the charge 174 has strayed beyond the separation distance 184.

In some embodiments, the camera 116 of the second wearable article 108 may continually capture the still and/or video images 164 of the charge 174. The controller 112 of the second wearable article 108 may transmit the captured image or images 164 of the charge 174 to the first wearable article 102. The guardian 168 may thus be continually aware of the location and surroundings of the charge 174 and may enable the guardian 168 to locate the charge 174 if the charge 174 strays beyond the separation distance 184. In some applications, the controller 112 of the first wearable article 102 may in like manner transmit captured image or images 164 of the guardian 168 to the second wearable article 108 such that the charge 174 can locate the guardian 168.

Upon subsequent placement of the second wearable article 108 within the activation distance of the first wearable article 102, the controller 112 of each of the first wearable article 102 and the second wearable article 108 may actuate the strap lock 128. The strap lock 128 may unlock the article fastening device 140 to facilitate removal of the first wearable article 102 from the guardian 168 and the second wearable article 108 from the charge 174.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A charge and guardian safety system comprising:

a first wearable article configured to be worn by a guardian;

a second wearable article configured to be worn by a charge of the guardian;

wherein each of the first wearable article and the second wearable article further comprising a respective system console having a respective console housing, and at least one respective article fastening device carried by the respective console housing for attachment to the corresponding guardian or chase;

wherein at least one of the respective system consoles of the first wearable article and the second system console are configured to emit at least one alarm if the second wearable article travels farther than a predetermined activation distance from the first wearable article, and at least one of the respective fastening devices of the first wearable article and the second wearable article is configured to tighten or contract with the emittance of the at least one alarm;

wherein each of the at least one respective article fastening devices of the first wearable article and the second wearable article further comprises a respective first strap segment and a respective second strap segment configured to detachably engage the respective first strap segment thereof;

wherein each of the respective at least one article fastening devices of the first wearable article and the second wearable article further comprises at least one respective strap fastener for detachably fastening the respective second strap segment to the respective first strap segment thereof;

wherein each of the first wearable article and the second wearable article further comprises a respective controller functionally interfaced with a respective strap lock, the respective strap lock operably interfaced with the respective at least one strap fastener thereof to maintain the respective at least one strap fastener thereof in a secure configuration until the first wearable article and the second wearable article are brought into a proximity to each other that is equal to or less than the predetermined activation distance; and wherein at least one of the first wearable article and the second wearable article further comprises at least one air pump operably interfaced with the respective controller thereof, and the at least one air pump configured to tighten the respective first strap segment and the respective second strap segment thereof substantially simultaneously with the emittance of the at least one alarm.

2. The charge and guardian safety system of claim 1, wherein each of the at least one respective strap fasteners of the first wearable article and the second wearable article further comprises a respective plurality of strap openings in the respective first strap segment thereof and at least one respective strap fastening stud on the respective second strap segment thereof configured for detachably engaging a select one opening of the plurality of strap openings thereof.

3. The charge and guardian safety system of claim 2, wherein each of the first wearable article and the second wearable article further comprises a respective first housing extension and a respective second housing extension extending from the respective console housing of the system console thereof, and the first respective strap segment thereof and the respective second strap segment thereof extending from the respective first housing extension and the respective second housing extension.

4. The charge and guardian safety system of claim 1, wherein the at least one alarm comprises at least a visible alarm comprising at least one LED.

5. The charge and guardian safety system of claim 1, wherein the at least one alarm comprises at least one audible alarm.

6. The charge and guardian safety system of claim 1, wherein the first wearable article and the second wearable article are configured for an electronically pairing thereof.

7. The charge and guardian safety system of claim 1, wherein the second wearable article comprises at least one camera interfaced with the respective controller thereof configured to transmit an image of the charge from the second wearable article worn by the charge to the first wearable article worn by the guardian.

8. The charge and guardian safety system of claim 7, wherein the first wearable article further comprises at least one display on the respective console housing of the system console thereof operably interfaced with the respective controller thereof, the respective controller configured to present the image of the charge transmitted on the at least one display.

9. The charge and guardian safety system of claim 1, wherein the second wearable article comprises a Global Positioning System (GPS) interfaced with the respective controller thereof for presenting a GPS signal indicative of a location of the second wearable article worn by the charge.

10. The charge and guardian safety system of claim 1, wherein the respective at least one article fastening devices of the first wearable article and the second wearable article are configured such that the first wearable article may not be released and removed from the guardian and the second wearable article may not be released and removed from the charge unless the first wearable article and the second wearable article are within the predetermined activation distance of each other.

11. A charge and guardian safety system comprising:

a first wearable article configured to be worn by a guardian;

a second wearable article configured to be worn by a charge of the guardian, wherein the first wearable article and the second wearable article are configured for an electronically pairing thereof;

wherein each of the first wearable article and the second wearable article further comprising a respective system console having a respective console housing, and at least one respective article fastening device carried by the respective console housing for attachment to the corresponding guardian or chase;

wherein at least one of the respective system consoles of the first wearable article and the second system console are configured to emit at least one alarm if the second wearable article travels farther than a predetermined activation distance from the first wearable article, and at least one of the respective fastening devices of the first wearable article and the second wearable article is configured to tighten or contract with the emittance of the at least one alarm;

wherein the respective at least one article fastening devices of the first wearable article and the second wearable article are configured such that the first wearable article may not be released and removed from the guardian and the second wearable article may not be released and removed from the charge unless the first wearable article and the second wearable article are within the predetermined activation distance of each other;

wherein each of the at least one respective article fastening devices of the first wearable article and the second wearable article further comprises a respective first strap segment and a respective second strap segment configured to detachably engage the respective first strap segment thereof;

wherein each of the at least one respective strap fasteners of the first wearable article and the second wearable article further comprises a respective plurality of strap openings in the respective first strap segment thereof and at least one respective strap fastening stud on the respective second strap segment thereof configured for detachably engaging a selected one opening of the plurality of strap openings thereof;

wherein each of the first wearable article and the second wearable article further comprises a respective controller functionally interfaced with a respective strap lock, the respective strap lock operably interfaced with the respective at least one strap fastener thereof to maintain the respective at least one strap fastener thereof in a secure configuration until the first wearable article and the second wearable article are brought into a proximity to each other that is equal to or less than the predetermined activation distance; and wherein at least one of the first wearable article and the second wearable article further comprises at least one air pump operably interfaced with the respective controller thereof, and the at least one air pump configured to tighten the respective first strap segment and the respective second strap segment thereof substantially simultaneously with the emittance of the at least one alarm.

12. A charge and guardian safety system comprising:

a first wearable article configured to be worn by a guardian;

a second wearable article configured to be worn by a charge of the guardian, wherein the first wearable article and the second wearable article are configured for an electronically pairing thereof;

wherein each of the first wearable article and the second wearable article further comprising a respective system console having a respective console housing, and at least one respective article fastening device carried by the respective console housing for attachment to the corresponding guardian or chase;

wherein each of the at least one respective article fastening devices of the first wearable article and the second wearable article further comprises a respective first strap segment and a respective second strap segment configured to detachably engage the respective first strap segment thereof;

wherein each of the at least one respective strap fasteners of the first wearable article and the second wearable article further comprises a respective plurality of strap openings in the respective first strap segment thereof and at least one respective strap fastening stud on the respective second strap segment thereof configured for detachably engaging a selected one opening of the plurality of strap openings thereof;

wherein at least one of the respective system consoles of the first wearable article and the second system console are configured to emit at least one alarm if the second wearable article travels farther than a predetermined activation distance from the first wearable article, and at least one of the respective fastening devices of the first wearable article and the second wearable article is configured to tighten or contract with the emittance of the at least one alarm, the at least one alarm comprising at least one of a visible alarm and an audible alarm;

wherein each of the first wearable article and the second wearable article further comprises a respective controller functionally interfaced with a respective strap lock, the respective strap lock operably interfaced with the respective at least one strap fastener thereof to maintain the respective at least one strap fastener thereof in a secure configuration until the first wearable article and the second wearable article are brought into a proximity to each other that is equal to or less than the predetermined activation distance;

wherein at least one of the first wearable article and the second wearable article further comprises at least one air pump operably interfaced with the respective controller thereof, and the at least one air pump configured to tighten the respective first strap segment and the respective second strap segment thereof substantially simultaneously with the emittance of the at least one alarm; and wherein the respective at least one article fastening devices of the first wearable article and the second wearable article are configured such that the first wearable article may not be released and removed from the guardian and the second wearable article may not be released and removed from the charge unless the first wearable article and the second wearable article are within the predetermined activation distance of each other.

* * * * *